United States Patent
Tsirkin

(10) Patent No.: US 10,387,178 B2
(45) Date of Patent: *Aug. 20, 2019

(54) IDLE BASED LATENCY REDUCTION FOR COALESCED INTERRUPTS

(71) Applicant: Red Hat Israel, Ltd., Raanana (IL)

(72) Inventor: Michael S. Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 662 days.

This patent is subject to a terminal disclaimer.

(21) Appl. No.: 14/527,624

(22) Filed: Oct. 29, 2014

(65) Prior Publication Data

US 2016/0124761 A1   May 5, 2016

(51) Int. Cl.
*G06F 9/48* (2006.01)
*G06F 9/52* (2006.01)
*G06F 9/455* (2018.01)

(52) U.S. Cl.
CPC ...... *G06F 9/45545* (2013.01); *G06F 9/45533* (2013.01); *G06F 9/45558* (2013.01); *G06F 9/4812* (2013.01); *G06F 9/4881* (2013.01); *G06F 9/52* (2013.01); *G06F 2009/45579* (2013.01)

(58) Field of Classification Search
CPC ............. G06F 11/3466; G06F 11/3688; G06F 2201/865; G06F 9/52; G06F 9/4881; G06F 9/45533
USPC ........................................... 718/1, 104, 107
See application file for complete search history.

(56) References Cited

U.S. PATENT DOCUMENTS

| | | | |
|---|---|---|---|
| 6,189,067 B1 | 2/2001 | Lowe et al. | |
| 6,266,732 B1 | 7/2001 | Chen et al. | |
| 6,988,156 B2 * | 1/2006 | Musumeci | G06F 13/24 710/104 |
| 7,788,435 B2 | 8/2010 | Worthington et al. | |
| 7,987,307 B2 | 7/2011 | Sarangam et al. | |
| 8,291,135 B2 | 10/2012 | Subramanian et al. | |
| 8,478,924 B2 | 7/2013 | Ahmad et al. | |
| 8,935,699 B1 * | 1/2015 | Vincent | G06F 9/4881 712/244 |
| 9,317,318 B2 * | 4/2016 | Zheng | G06F 9/45533 |
| 9,317,325 B2 * | 4/2016 | McGrath | G06F 9/485 |
| 9,419,917 B2 * | 8/2016 | Eaton | H04L 47/785 |
| 9,697,029 B2 * | 7/2017 | Tsirkin | G06F 9/45545 |
| 9,703,589 B2 * | 7/2017 | Zheng | G06F 9/45558 |

(Continued)

OTHER PUBLICATIONS

Blagodurov et al., "ACaseforNUMA-awareContention ManagementonMulticoreSystems" (Year: 2011).*

(Continued)

*Primary Examiner* — Phillip H Nguyen
(74) *Attorney, Agent, or Firm* — Lowenstein Sandler LLP

(57) ABSTRACT

A guest operating system of a virtual machine sends a request to a hypervisor to coalesce interrupts from a networking device. The guest operating system then monitors the execution state of an application on the virtual machine to detect when the application becomes idle. Upon detecting that the application is idle, the guest operating system can send a request to the hypervisor for any coalesced interrupts that have been queued for delivery to the application. The guest operating system may then receive the coalesced interrupts from the hypervisor and deliver them to the application.

20 Claims, 3 Drawing Sheets

(56) References Cited

U.S. PATENT DOCUMENTS

| | | | |
|---|---|---|---|
| 2003/0037089 A1* | 2/2003 | Cota-Robles | G06F 9/4881 718/1 |
| 2003/0200369 A1* | 10/2003 | Musumeci | G06F 13/24 710/260 |
| 2004/0117534 A1* | 6/2004 | Parry et al. | 710/260 |
| 2004/0221285 A1* | 11/2004 | Donovan | G06F 9/485 718/1 |
| 2010/0077394 A1* | 3/2010 | Wang | G06F 9/45533 718/1 |
| 2010/0274940 A1* | 10/2010 | Ahmad et al. | 710/267 |
| 2011/0106993 A1* | 5/2011 | Arinobu | G06F 9/45533 710/262 |
| 2011/0179413 A1* | 7/2011 | Subramanian | G06F 9/45558 718/1 |
| 2013/0138760 A1* | 5/2013 | Tsirkin | 709/213 |
| 2013/0297668 A1* | 11/2013 | McGrath | G06F 9/485 709/201 |
| 2014/0237149 A1* | 8/2014 | Jacobs | G06F 13/24 710/260 |
| 2014/0334301 A1* | 11/2014 | Billaud | H04L 47/782 370/230.1 |
| 2015/0055499 A1* | 2/2015 | Zheng | H04L 47/56 370/252 |
| 2015/0058846 A1* | 2/2015 | Zheng | H04L 47/56 718/1 |
| 2015/0339155 A1* | 11/2015 | Tsirkin | G06F 9/4837 710/267 |
| 2016/0124761 A1* | 5/2016 | Tsirkin | G06F 9/45545 718/1 |
| 2016/0124762 A1* | 5/2016 | Tsirkin | G06F 9/45545 718/1 |
| 2016/0170474 A1* | 6/2016 | Takemura | G06F 1/3287 713/324 |

OTHER PUBLICATIONS

Ahmad et al., "Improving Performance with Interrupt Coalescing for Virtual Machine Disk IO in VMware ESX Server" (Year: 2014).*

Dong et al., "Optimizing Network I/O Virtualization with Efficient Interrupt Coalescing and Virtual Receive Side Scaling" (Year: 2011).*

No Author, "Best Practices for Performance Tuning of Latency-Sensitive Workloads in vSphere VMs," VMware, Inc. Technical White Paper, 2013, 10 pages, World Wide Web, http://www.vmware.com/files/pdf/techpaper/VMW-Tuning-Latency-Sensitive-Workloads.pdf.

Christian Herber et al., "Deadline-Aware Interrupt Coalescing in Controller Area Network (CAN)," IEEE, 2014, 8 pages, World Wide Web, http://download.lis.ei.tum.de/publications/pub_423368.pdf.

No Author, "vIC: Interrupt Coalescing for Virtual Machine Storage Device IO," Retrieved from the Internet on Oct. 29, 2014, 2 pages, World Wide Web, http://www.cse.iitd.ernet.in/~sbansal/csl862-virt/lec/vIC.txt.

No Author, "Interrupt Coalescing," Wikipedia, The Free Encyclopedia, Retrieved from the Internet on Oct. 29, 2014, 1 page, World Wide Web, http://en.wikipedia.org/wiki/Interrupt_coalescing.

* cited by examiner

IDLE BASED LATENCY REDUCTION FOR COALESCED INTERRUPTS

TECHNICAL FIELD

The present disclosure is generally related to computer systems, and more particularly, to interrupt processing in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

One resource managed by the host machine is a networking device that may be used by multiple virtual machines operating at the same time. The networking device can have multiple queues for managing incoming packets to be received by a virtual machine and outgoing packets transmitted by a virtual machine. When the networking device has completed a unit of work, it can deliver a signal to the requesting virtual machine to indicate that packets are ready for delivery, typically known as an "interrupt." Interrupt coalescing is a technique in which the device defers delivery of the interrupts until a predetermined number of interrupts are queued, or an interval timer has triggered.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
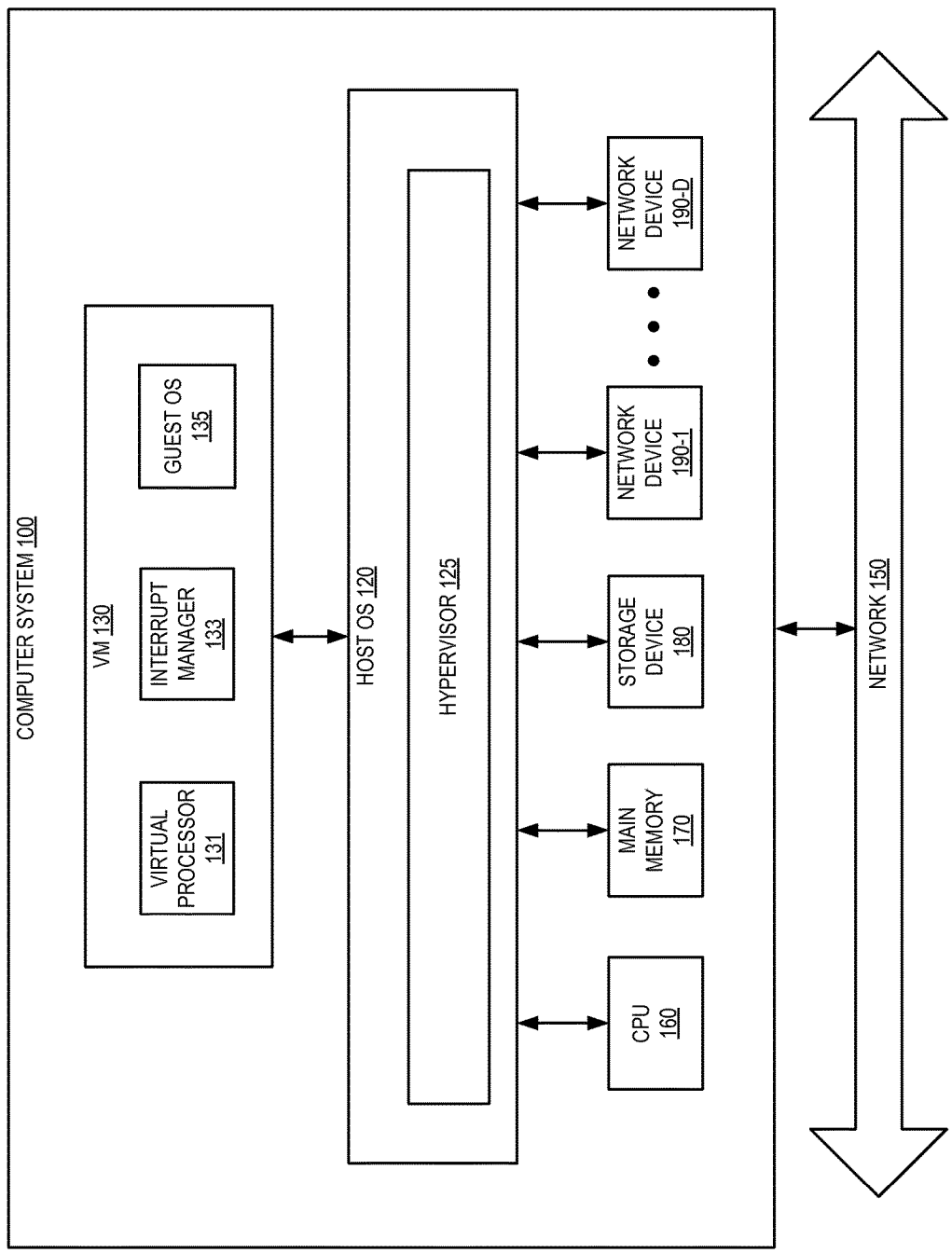
FIG. 1 depicts a high-level component diagram of an example computer system architecture, in accordance with one or more aspects of the present disclosure.

Described herein are methods and systems by which a guest operating system of a virtual machine manages interrupt coalescing.

One resource managed by the host machine is a networking device that may be used by multiple virtual machines operating at the same time. When the networking device has completed a unit of work, it can deliver a signal to the requesting virtual machine to indicate that packets are ready for delivery, typically known as an "interrupt." Interrupt coalescing is a technique in which the networking device defers delivery of the interrupts until a predetermined number of interrupts are queued, or an interval timer has triggered. This technique can reduce interrupt load on a virtual machine and reduce the risk that an interrupt will interfere with an application submitting new requests. However, it can increase latency to the point where the application may become blocked while waiting for the interrupt to arrive, preventing it from completing any additional work. This can result in an increase in idle time, wasting CPU resources, as well as a significant decrease in operational throughput.

Aspects of the present disclosure address the above noted deficiency by decreasing the latency inherent with coalescing without significantly interrupting the application. In an illustrative example, a guest OS of a VM sends a request to a hypervisor to coalesce interrupts from a networking device. Interrupts may be queued by the networking device, by the hypervisor in a shared memory space, or in any other manner. The guest OS can then monitor the execution state of an application on the VM (that may be waiting for the coalesced interrupts) to detect when the application becomes idle. An application can become idle by entering a state in which the application may be waiting on the completion of an input/output (I/O) operation, a state in which the application transitions responsive to executing a particular instruction (e.g., an HLT instruction, etc.), or the like. In certain implementations, the application on the VM can be engaged in network operations that involve packet transfer to and from a networking device.

Upon detecting that the application is idle, the guest OS can send a request to the hypervisor for any coalesced interrupts that have been queued for delivery to the application. In some implementations, the guest OS may detect that the application is idle by determining that the application is waiting for packets from the networking device, and therefore, not executing any other function. Alternatively, the guest OS may detect that the application is idle by determining that a virtual processor of the virtual machine associated with the application has stopped running in response to the guest executing a privileged instruction.

The guest OS may send the request for the coalesced interrupts by sending a request to the hypervisor to temporarily disable coalescing for the interrupts from the networking device. By temporarily disabling coalescing, any interrupts that have been queued for delivery as well as any additionally interrupts that are subsequently generated while coalescing is disabled can be sent to the application. Upon delivery of the interrupts, coalescing can be re enabled. Alternatively, the guest OS may send a request for the coalesced interrupts by sending a request to the hypervisor to immediately send the coalesced interrupts from the networking device to the guest without disabling coalescing. In this case, the hypervisor can deliver those interrupts in queue, but may hold any new interrupts that are generated after receipt of the request from the guest.

The guest OS can receive the coalesced interrupts from the hypervisor and deliver them to the application. The application can then process the interrupts, any packets associated with the interrupts, and then continue execution of other tasks. Subsequently, the guest OS can send a request to the hypervisor to stop coalescing interrupts from the networking device.

Aspects of the present disclosure are thus capable of improving latency for applications running within a guest OS of a VM. More particularly, aspects of the present disclosure allow a guest OS to proactively request coalesced interrupts from a hypervisor upon detecting that an application is waiting for interrupts to be sent.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Universal Serial Bus [USB] solid state drive, a Redundant Array of Independent Disks [RAID] system, a network attached storage [NAS] array, etc.), and one or more network devices 190-1 through 190-D, where D is a positive integer (e.g., a network interface controller (NIC), an I/O device, a CD/DVD-ROM drive, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machine (VM) 130 and host operating system (OS) 120. VM 130 is a software implementation of a machine that executes programs as though it were an actual physical machine. Host OS 120 manages the hardware resources of the computer system and provides functions such as inter-process communication, scheduling, memory management, and so forth.

VM 130 may comprise a guest operating system (OS) 135 that handles the execution of applications within the virtual machine, one or more virtual processor 131, and interrupt manager 133. It should be noted that although, for simplicity, a single virtual machine 130 is depicted in FIG. 1, computer system 100 may host a plurality of VMs 130.

Interrupt manager 133 can manage coalesced interrupt processing associated with VM 130, as described in detail below with respect to FIG. 2. Interrupt manager 133 can monitor the execution state of applications running on VM 130 and send requests to hypervisor 125 for coalesced interrupts that may be queued by network devices 190-1 through 190-D. Additionally, interrupt manager 133 can send requests to hypervisor 125 to both enable and disable interrupt coalescing for any of network devices 190-1 through 190-D. It should be noted that in some alternative implementations, interrupt manager 133 may be embedded within guest OS 135, rather than external to guest OS 135.

Host OS 120 may comprise a hypervisor 125, which provides a virtual operating platform for VMs 130 and manages their execution. It should be noted that in some alternative implementations, hypervisor 125 may be external to host OS 120, rather than embedded within host OS 120, or may replace host OS 120.

Figure 2:
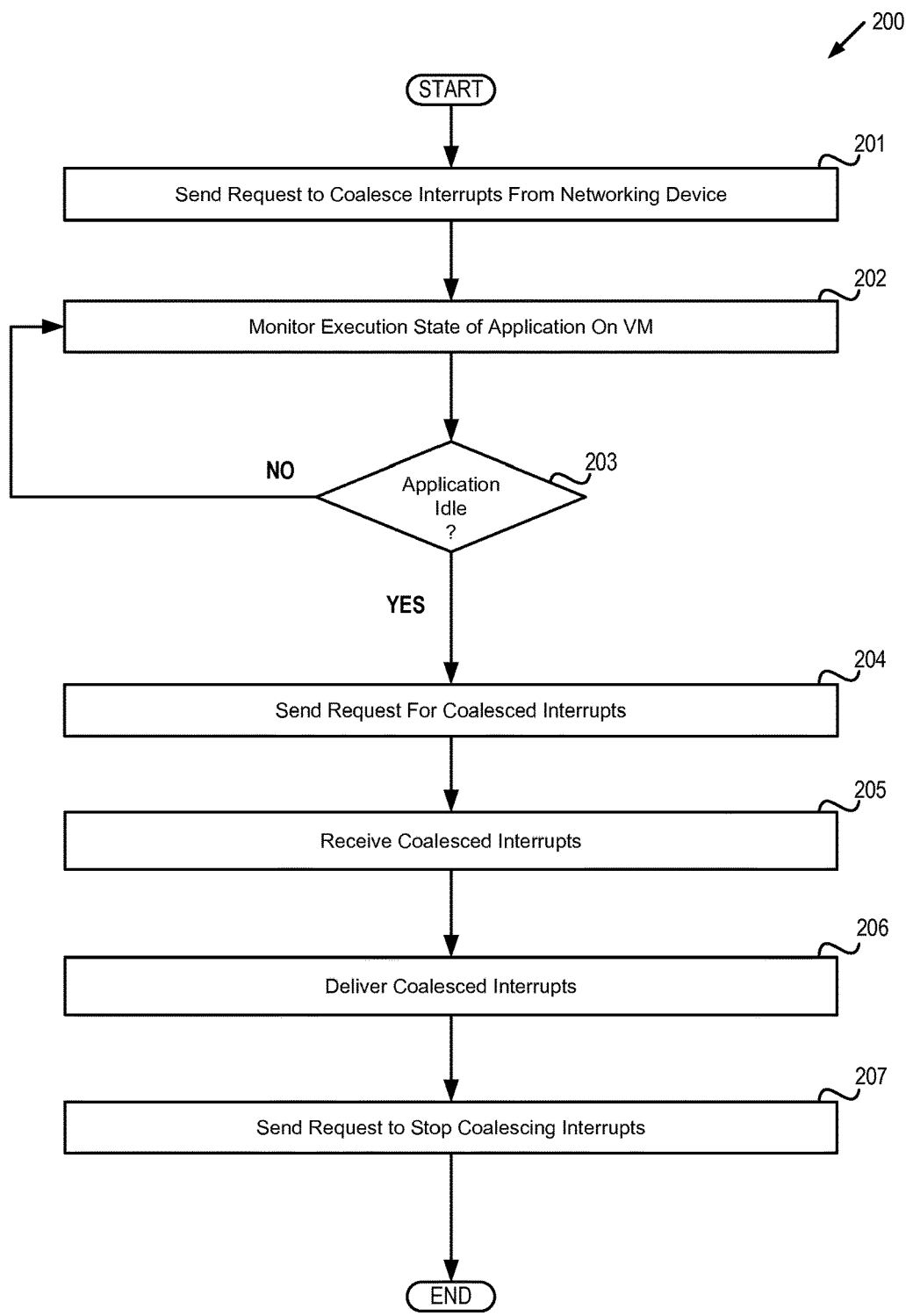
FIG. 2 depicts a flow diagram of a method for managing coalesced interrupt processing associated with a virtual machine, in accordance with one or more aspects of the present disclosure.

FIG. 2 depicts a flow diagram of an example method 200 for managing coalesced interrupt processing associated with a virtual machine. The method may be performed by processing logic that may comprise hardware (circuitry, dedicated logic, etc.), software (such as is run on a general purpose computer system or a dedicated machine), or a combination of both. In one illustrative example, method 200 may be performed by interrupt manager 133 of VM 130 in FIG. 1. Alternatively, some or all of method 200 might be performed by another machine. It should be noted that blocks depicted in FIG. 2 could be performed simultaneously or in a different order than that depicted.

At block 201, processing logic sends a request to a hypervisor to coalesce interrupts from a networking device. Interrupts may be queued by the networking device, by the hypervisor in a shared memory space, or in any other manner.

At block 202, processing logic begins monitoring the execution state of an application on the VM to detect when the application becomes idle. An application can become idle by entering a state in which the application is waiting on the completion of an input/output (I/O) operation, a state in which the application transitions responsive to executing a particular instruction (e.g., an HLT instruction, etc.), or the like. In certain implementations, the application on the VM can be engaged in network operations that involve packet transfer to and from a networking device.

At block 203, processing logic determines whether the application becomes idle. If so, execution proceeds to block 204, otherwise, execution returns to block 202 to continue monitoring. In some implementations, processing logic may detect that the application is idle by determining that the application is waiting for packets from the networking device, and therefore, not executing any other function. Alternatively, processing logic may detect that the application is idle by determining that a virtual processor of the virtual machine associated with the application has stopped running in response to the guest executing a privileged instruction.

At block 204, processing logic sends a request for coalesced interrupts. In some implementations, processing logic may send the request for the coalesced interrupts by sending a request to the hypervisor to temporarily disable coalescing for the interrupts from the networking device. By temporarily disabling coalescing, any interrupts that have been queued for delivery as well as any additionally interrupts that are subsequently generated while coalescing is disabled can be sent to the application. Upon delivery of the interrupts, coalescing can be re enabled. Alternatively, processing logic may send a request for the coalesced interrupts by sending a request to the hypervisor to immediately send the coalesced interrupts from the networking device to the guest without disabling coalescing. In this case, the hypervisor can deliver those interrupts in queue, but may hold any new interrupts that are generated after receipt of the request from the guest.

At block 205, processing logic receives the coalesced interrupts from the hypervisor. At block 206, processing logic delivers the coalesced interrupts to the application, which can process the interrupts, any associated data packets, and subsequently continue execution of other tasks. At block 207, processing logic sends a request to the hypervisor to stop coalescing interrupts from the networking device. After block 207, the method of FIG. 2 terminates.

Figure 3:
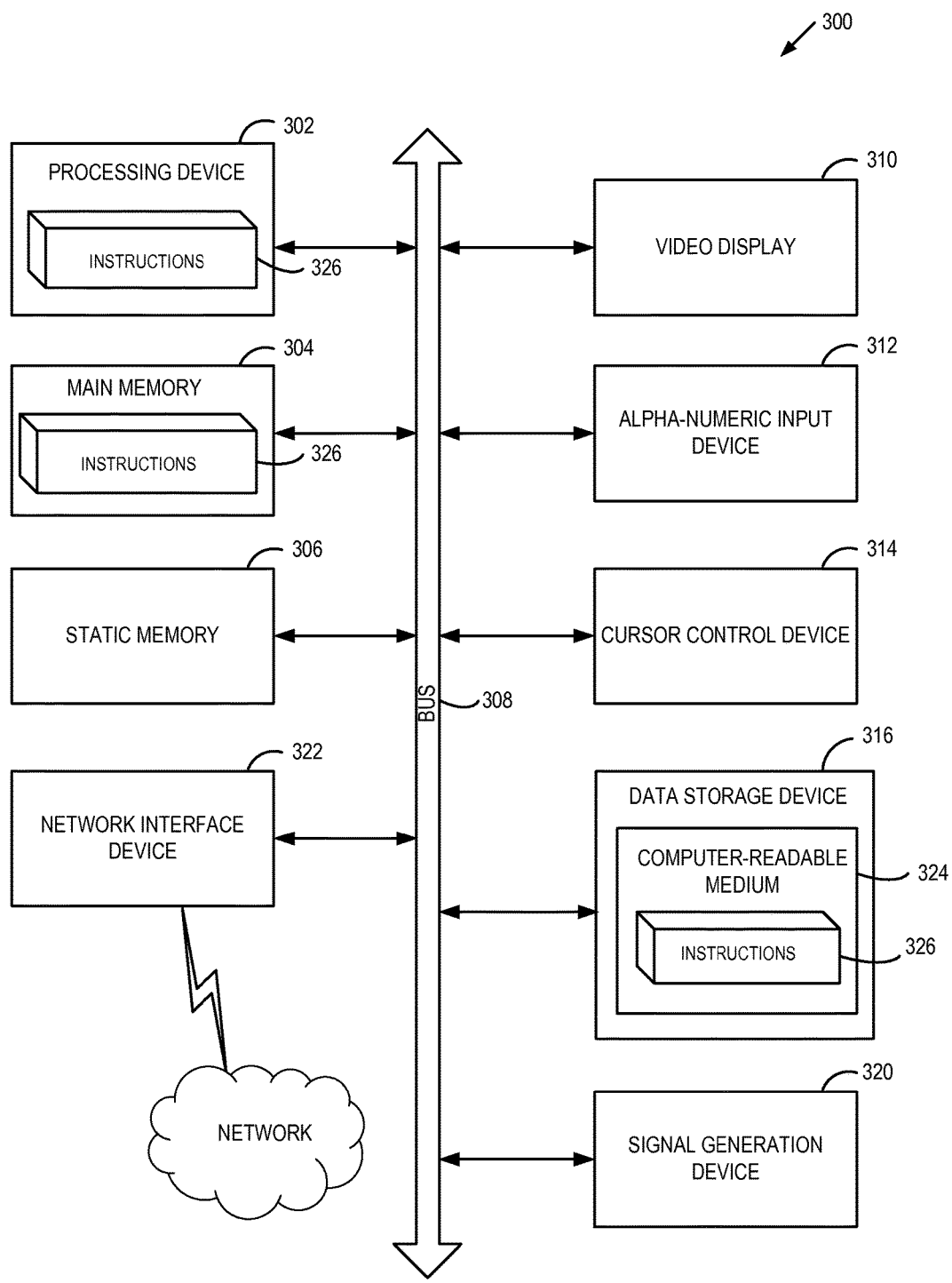
FIG. 3 depicts a block diagram of an illustrative computer system operating in accordance with examples of the invention.

FIG. 3 depicts an example computer system 300 which can perform any one or more of the methods described herein. In one example, computer system 300 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 2, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:

1. A method comprising:
   sending, by a processing device executing a guest operating system of a virtual machine, a request to a hypervisor to coalesce interrupts from a networking device in a queue;
   monitoring an execution state of an application on the virtual machine to detect when the application becomes idle;
   upon detecting that the application is idle, sending, by the processing device executing the guest operating system, a request to the hypervisor for the interrupts coalesced in the queue; and
   receiving the coalesced interrupts from the hypervisor.

2. The method of claim 1 further comprising delivering, by the guest operating system, the coalesced interrupts to the application.

3. The method of claim 2 further comprising sending, by the guest operating system, a request to the hypervisor to stop coalescing interrupts from the networking device.

4. The method of claim 1, wherein sending the request for the coalesced interrupts comprises sending a request to the hypervisor to temporarily disable coalescing interrupts from the networking device.

5. The method of claim 1, wherein sending the request for the coalesced interrupts comprises sending a request to the hypervisor to immediately send the coalesced interrupts from the networking device to the guest without disabling coalescing.

6. The method of claim 1, wherein detecting that the application is idle comprises determining that the application is waiting for packets from the networking device.

7. The method of claim 1, wherein detecting that the application is idle comprises determining that a virtual processor of the virtual machine has stopped running in response to the guest operating system executing a privileged instruction.

8. A computing apparatus comprising:
   a memory; and
   a processing device, operatively coupled to the memory, to execute a guest operating system of a virtual machine to:
   send a request to a hypervisor to coalesce interrupts from a networking device in a queue;
   monitor an execution state of an application on the virtual machine to detect when the application becomes idle;
   upon detecting that the application is idle, send a request to the hypervisor for the interrupts coalesced in the queue; and
   receive the coalesced interrupts from the hypervisor.

9. The apparatus of claim 8 wherein the processing device is further to deliver the coalesced interrupts to the application.

10. The apparatus of claim 9 wherein the processing device is further to send a request to the hypervisor to stop coalescing interrupts from the networking device.

11. The apparatus of claim 8, wherein to send the request for the coalesced interrupts, the processing device is to send a request to the hypervisor to temporarily disable coalescing for the interrupts from the networking device.

12. The apparatus of claim 8, wherein to send the request for the coalesced interrupts, the processing device is to send a request to the hypervisor to immediately send the coalesced interrupts from the networking device to the guest without disabling coalescing.

13. The apparatus of claim 8, wherein to detect that the application is idle, the processing device is to determine that the application is waiting for packets from the networking device.

14. The apparatus of claim 8, wherein to detect that the application is idle, the processing device is to determine that a virtual processor of the virtual machine has stopped running in response to the guest executing a privileged instruction.

15. A non-transitory computer readable storage medium, having instructions stored therein, which when executed by a processing device of a computer system, cause the processing device to:
   send, by the processing device executing a guest operating system of a virtual machine, a request to a hypervisor to coalesce interrupts from a networking device in a queue;
   monitor an execution state of an application on the virtual machine to detect when the application becomes idle;
   upon detecting that the application is idle, send, by the guest operating system of the virtual machine, a request to the hypervisor for the interrupts coalesced in the queue;
   receive the coalesced interrupts from the hypervisor; and
   deliver the coalesced interrupts to the application.

16. The non-transitory computer readable storage medium of claim 15, wherein the processing device is further to send, by the guest, a request to the hypervisor to stop coalescing interrupts from the networking device.

17. The non-transitory computer readable storage medium of claim 15, wherein to send the request for the coalesced interrupts, the processing device is to send a request to the hypervisor to temporarily disable coalescing for the interrupts from the networking device.

18. The non-transitory computer readable storage medium of claim 15, wherein to send the request for the coalesced interrupts, the processing device is to send a request to the hypervisor to immediately send the coalesced interrupts from the networking device to the guest without disabling coalescing.

19. The non-transitory computer readable storage medium of claim 15, wherein to detect that the application is idle, the processing device is to determine that the application is waiting for packets from the networking device.

20. The non-transitory computer readable storage medium of claim 15, wherein to detect that the application is idle, the processing device is to determine that a virtual processor of the virtual machine has stopped running in response to the guest executing a privileged instruction.

* * * * *